(12) United States Patent
Donisi et al.

(10) Patent No.: US 10,271,558 B1
(45) Date of Patent: *Apr. 30, 2019

(54) AUTOMATED SANDWICH ASSEMBLY UNIT

(71) Applicants: Kevin Bishop, Brentwood, TN (US);
Victor Donisi, Nashville, TN (US)

(72) Inventors: Victor Donisi, Nashville, TN (US);
Cordia Harrington, Nashville, TN (US)

(73) Assignee: Kevin Bishop, Brentwood, TN (US)

( * ) Notice: Subject to any disclaimer, the term of this patent is extended or adjusted under 35 U.S.C. 154(b) by 183 days.

This patent is subject to a terminal disclaimer.

(21) Appl. No.: 15/359,891

(22) Filed: Nov. 23, 2016

Related U.S. Application Data

(63) Continuation of application No. 14/200,014, filed on Mar. 6, 2014, now Pat. No. 9,532,575.

(60) Provisional application No. 61/773,241, filed on Mar. 6, 2013.

(51) Int. Cl.
*A21C 15/00* (2006.01)
*G07F 11/26* (2006.01)
*G07F 17/00* (2006.01)

(52) U.S. Cl.
CPC .......... *A21C 15/002* (2013.01); *A21C 15/007* (2013.01); *G07F 11/26* (2013.01); *G07F 17/0078* (2013.01)

(58) Field of Classification Search
CPC ...... G07F 17/0078; G07F 11/26; G07F 11/54; G07F 11/70; A21C 15/002
USPC .. 99/357, 373, 391, 393, 443 C, 494, 450.4; 221/13, 76, 85, 150 HC, 150 R, 150 A
See application file for complete search history.

(56) References Cited

U.S. PATENT DOCUMENTS

| | | |
|---|---|---|
| 3,859,904 A | 1/1975 | Carriazo |
| 4,202,260 A | 5/1980 | Weger |
| 4,685,387 A | 8/1987 | Hanson et al. |
| 4,944,387 A | 7/1990 | Burke |
| 5,113,753 A | 5/1992 | Robinson |
| 5,365,835 A | 11/1994 | Naramura |
| 5,517,904 A | 5/1996 | Vargas et al. |
| 5,540,943 A | 7/1996 | Naramura |
| 5,554,225 A | 9/1996 | DeMars |
| 6,802,433 B2 | 10/2004 | Leykin et al. |

FOREIGN PATENT DOCUMENTS

| | | |
|---|---|---|
| EP | 296496 A2 | 12/1988 |

OTHER PUBLICATIONS

Szondy, David, "Hamburger-making machine churns out custom burgers at industrial speeds", www.gizmag.com, Good Thinking, Nov. 25, 2012, at http://www.gizmag.com/hamburger-machine/25159/.

*Primary Examiner* — Reginald Alexander
(74) *Attorney, Agent, or Firm* — Bradley Arant Boult Cummings; Phillip E Walker

(57) ABSTRACT

An automatic sandwich maker designed to automate the process of preparing sandwiches, including hamburgers, is included. This automated sandwich maker is designed for use in commercial kitchens, including small commercial kitchens, such as fast-food kitchens. The apparatus and method for automatically making sandwiches overcomes the drawbacks and limitations of the prior art. The individual sandwich process can be controlled by communications interface with a point of sales system. The inventive apparatus and method reduces manpower requirements for restaurants, provides enhanced ingredient control, and improves overall product quality.

13 Claims, 14 Drawing Sheets

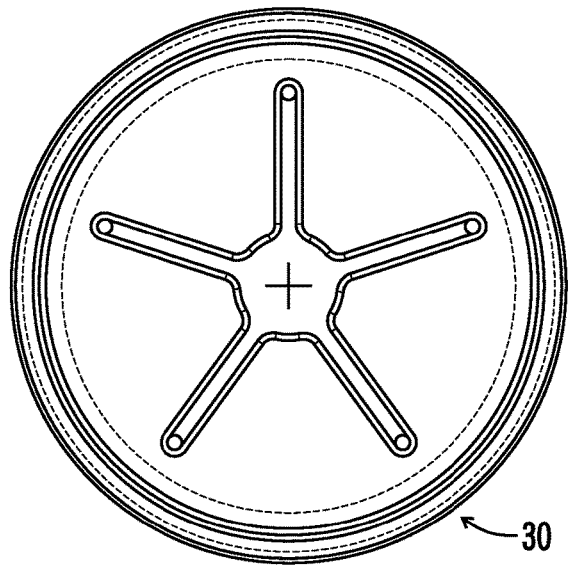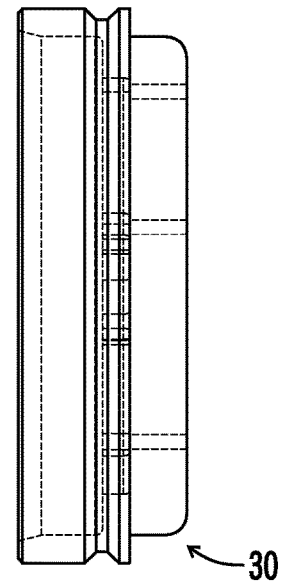
FIG. 9A    FIG. 9B
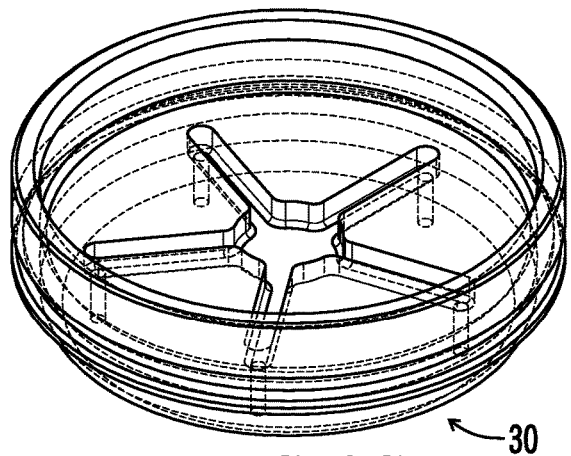
FIG. 9C

AUTOMATED SANDWICH ASSEMBLY UNIT

This is a is a Non-Provisional Utility Patent Application filed by Victor Donisi and Kevin Bishop for an invention by Victor Donisi, a citizen of the United States, and Cordia Harrington, a citizen of the United States, for the invention of an "Automated Sandwich Assembly Unit".

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

All patents and publications described or discussed herein are hereby incorporated by reference in their entirety.

CROSS-REFERENCES TO RELATED APPLICATIONS

This application claims benefit of U.S. Provisional Application No. 61/773,241 entitled "Automated Sandwich Assembly Unit", filed Mar. 6, 2013.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE DISCLOSURE

1. Technical Field

The present disclosure relates generally to the preparation of food products and, more particularly, but not by way of limitation, to preparing sandwiches consisting of an upper bread piece, a lower bread piece, and various food materials therebetween, the various food materials including patties, meats, vegetables, condiments, sauces and the like.

2. Background Art

Sandwiches, including hamburgers, are popular food items and are in high demand at restaurants. Despite an additional high demand that sandwich preparation be fast and reliable, most sandwich preparation at conventional restaurants is performed manually.

While a variety of automated sandwich makers exists which may advantageously provide for the automatic preparation of sandwiches, these prior art systems lack the desirability adequate for widespread incorporation by restaurants. Problems with prior art systems include a lack of consistent portion control, a lack of desirable controls systems, and an overall large size of the prior art machines and systems. Generally, prior art systems do not possess the logistical or economical feasibility sufficient to merit incorporation by a majority of restaurants.

What is desired therefore is an apparatus with a compact footprint, the apparatus being capable of automating at least part of the sandwich-making process in a consistent, reliable manner. Also desired is a method for making sandwiches using a combination of automatic and manual means. Indeed, a combination of characteristics has been found advantageous in providing the desired apparatus and/or method for making sandwiches.

BRIEF SUMMARY OF THE DISCLOSURE

The present disclosure provides an apparatus and method for automatically making sandwiches which overcomes the drawbacks and limitations of the prior art. The individual sandwich makeup can be controlled by communications interface to a point of sales system. Thus, the inventive apparatus and method reduces manpower requirements for restaurants, provides enhanced ingredient control, and improves overall product quality.

Briefly stated, one embodiment of the apparatus is comprised of a controls system, an indexing conveyor system, a scale dispensing system including vibrating hoppers, a bulk sauce metering system, a cartridge metering system, a stainless steel frame, and a supervisory control system with display.

The control system can directly control an indexing conveyer belt, and other systems, to allow the placement of ingredients on a sandwich by proper placement of the ingredients at the correct dispensing points for a particular sandwich. The control system can have an interface, such as Ethernet, for integration with the point of sale system, which allows for correct ingredient indexing. A motion control can be integrated with power line communication technology. All control system components can be preferably provided by a single vendor to allow for ease of integration and maintenance. The control system can also include a display which features system status of sauce levels and cartridge levels, system status of bulk and cartridge hoppers, daily production information, status of each station, product description of each order, status of the order that is pending, and completion instructions for the order.

The indexing conveyor system indexes box or paper based packaging and communicates with the control system for positioning. A sensor verifies box or paper placement. The indexing conveyor system has a belt made of materials approved by the Food and Drug Administration and full safety guarding approved for moving operation by the Occupational Safety and Health Administration. The conveyor system is wash-down ready to allow for easy cleaning. A tray located beneath the system is operable to catch any food ingredients that fall from the belt.

The scale dispensing system dispenses food materials such as lettuce, onions, and pickles onto a sandwich. The scale dispensing system includes stainless steel vibrating hoppers which are easily removed for cleaning. The scale dispensing system controls quantity of food ingredients using load cell technology.

The bulk sauce metering system dispenses food materials such as ketchup and mustard onto a sandwich. The bulk sauce metering system allows bulk products to be pumped directly from products shipped in bulk bags. The bulk sauce metering system can have a direct current motor with a variable speed controller. The actual bulk sauce dosage is determined by particular recipes for the actual sandwich being made. The variable speed controller allows for the control of flow profiles for different recipes. Bulk sauce can be delivered to the sandwiches through standard tubing sized, such as 3/16 inch and 1/4 inch outside diameters. Further, the bulk sauce metering system is designed in a manner that prevents contact between the system and food ingredients. The bulk sauce metering system can be raised above the indexing conveyor system and any food particles or ingredients positioned thereon. The amount of his spacing can vary according to the actual sandwich be made.

The cartridge metering system dispenses items such as tartar sauce, mayonnaise, and any other special sauce onto a sandwich. The cartridge metering system houses standard cartridges which may easily be changed. A sensor detects when the amount of product within the cartridge is at a low level. The cartridge metering system can be driven by direct current motor which allows for a correct metering amount.

The stainless steel frame provides for adequate structural support and shelving space. The stainless steel material offers longevity, easy cleaning, and desirable aesthetics. A plurality of parallel rollers can be attached beneath the frame for mobility of the unit. The compact footprint of the housing and the rollers allow for a wide variety of installation locations.

The supervisory control system may be accessed from a remote computer. The supervisory control system includes a display similar to the display of the control system described above. It features the system status of sauce levels and cartridge levels, the system status of bulk and cartridge hoppers, daily production information, the status of each station, the product description of each order, the status of order that is pending, and completion instructions for the order.

Advantageously, the above captioned embodiments of an automated sandwich-making apparatus and a method for making sandwiches provide for accurate order fulfillment, enhanced food safety, consistent portion control of ingredients, a compact and mobile footprint that allows for numerous installation options, easy maintenance and cleaning, and an overall high level of customer satisfaction.

As used herein the term "providing" and forms thereof are used in a broad sense and refer to, but are not limited to making available for use, enabling usage, giving, supplying, obtaining, getting hold of, acquiring, making ready for use, and/or placing in position ready for use.

Aside from the arrangements set forth above, the apparatus could include a number of other arrangements, such as those explained hereinafter. It is to be understood, that both the foregoing description and the following description are exemplary.

BRIEF DESCRIPTION OF THE DRAWINGS

The accompanying drawings are incorporated and constitute a part of the specification. The drawings illustrate optional embodiments of the apparatus and, together with the descriptions, serve to explain some principles of the apparatus.

FIG. 9a is an illustration showing a front view of a dispenser cap for condiments used with the dispenser case for condiments as seen in FIGS. 5-7.

FIG. 9b is an illustration showing a side view of a dispenser cap for condiments used with the dispenser case for condiments as seen in FIGS. 5-7.

FIG. 9c is an illustration showing a side perspective view of a dispenser cap for condiments used with the dispenser case for condiments as seen in FIGS. 5-7.

Figure 1A:
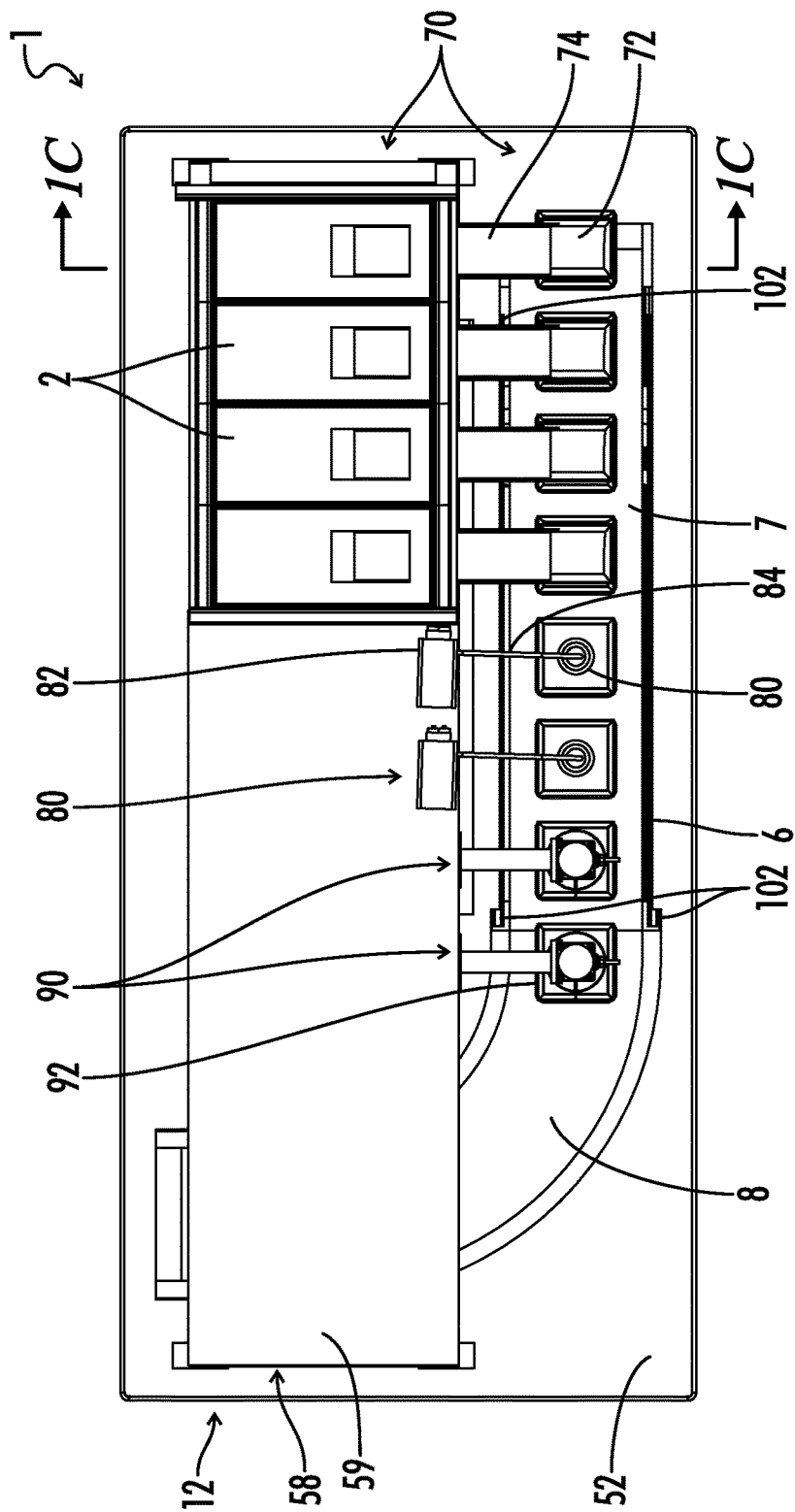
FIG. 1A is an illustration showing a top view of an automated sandwich maker according to one embodiment of the apparatus.
Figure 1B:
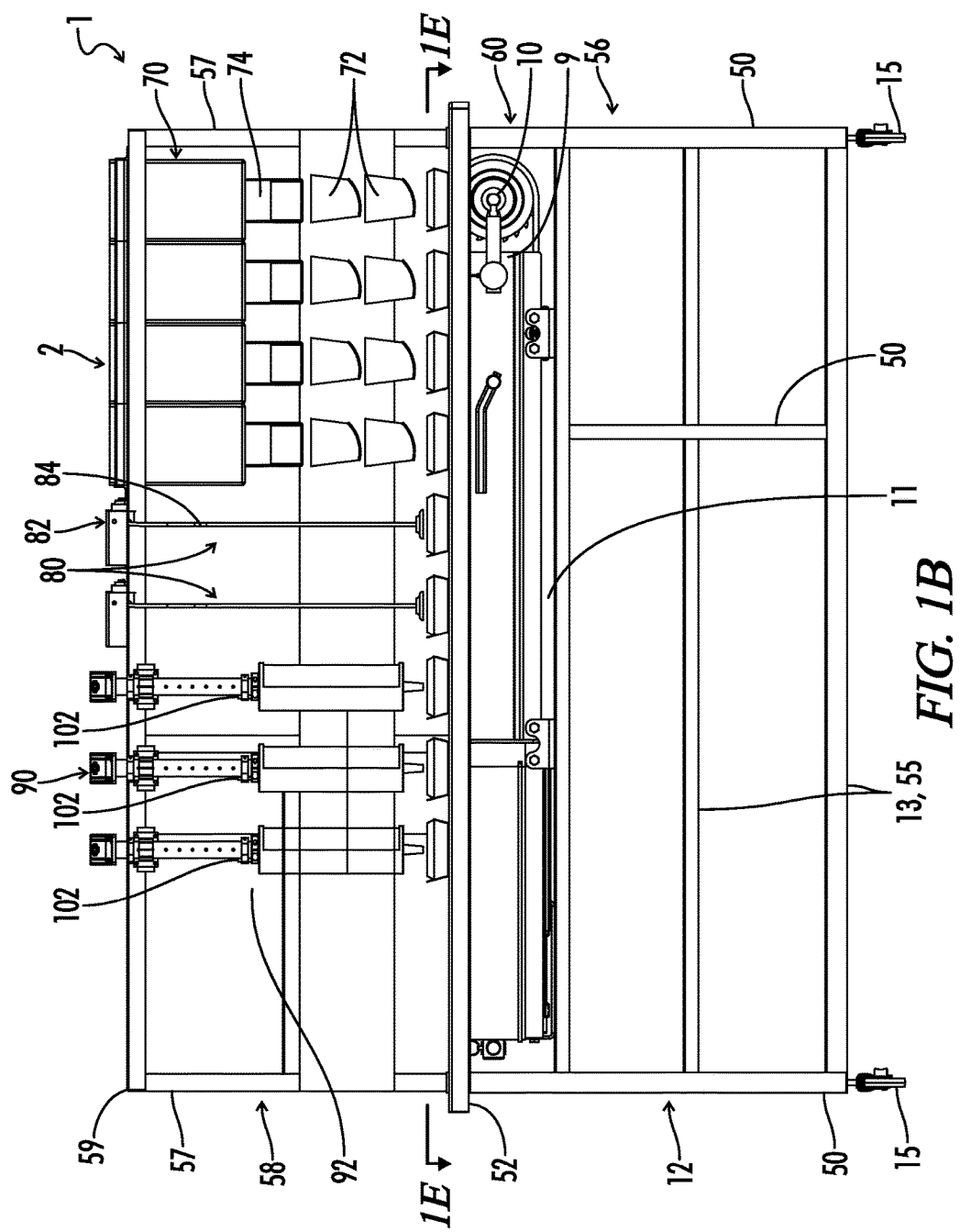
FIG. 1B is an illustration showing a front view of an automated sandwich maker according to FIG. 1A.
Figure 1C:
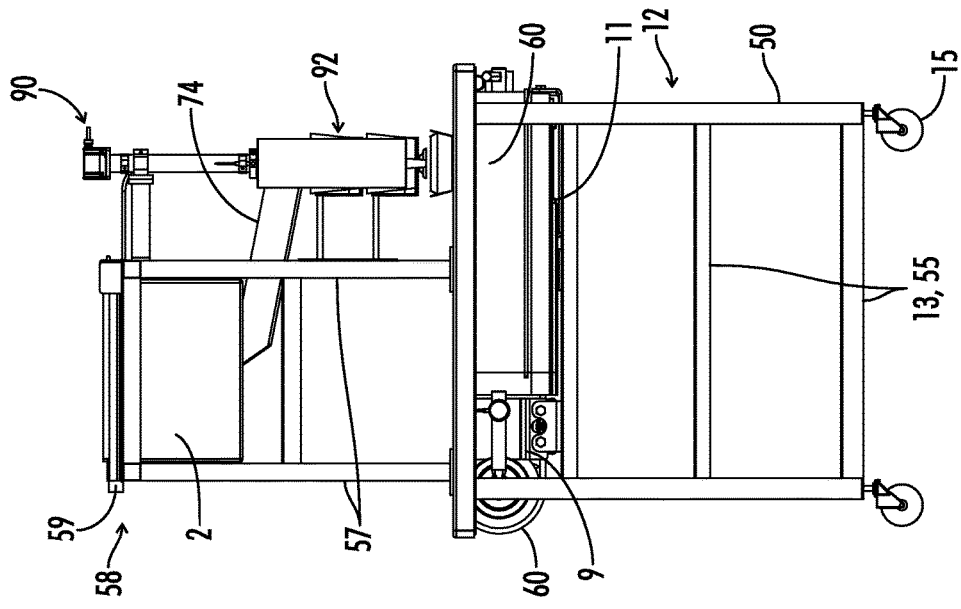
FIG. 1C is an illustration showing a right section view of an automated sandwich maker according to FIG. 1A.
Figure 1D:
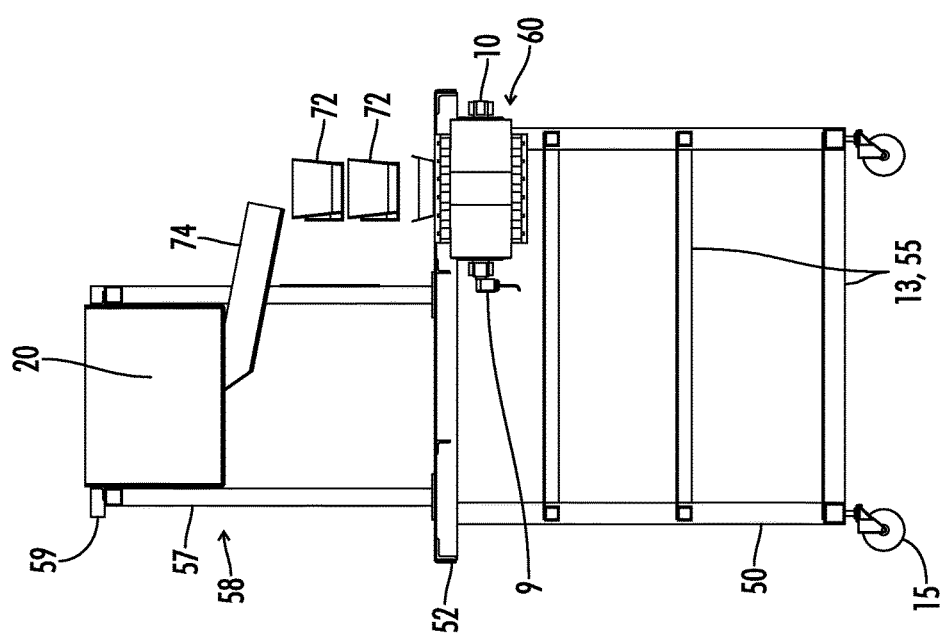
FIG. 1D is an illustration showing a left section view of an automated sandwich maker according to FIG. 1A.
Figure 1E:
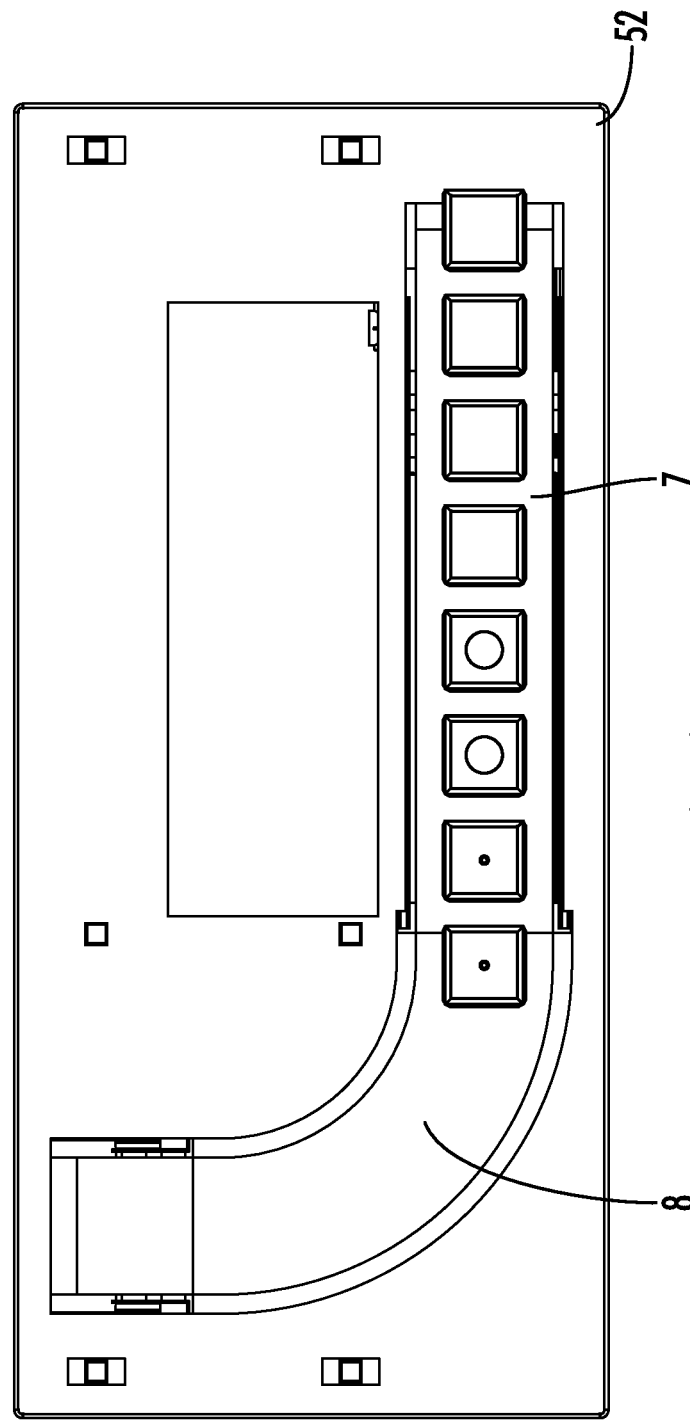
FIG. 1E is an illustration showing a top view of a work station according to FIG. 1A.
Figure 1F:
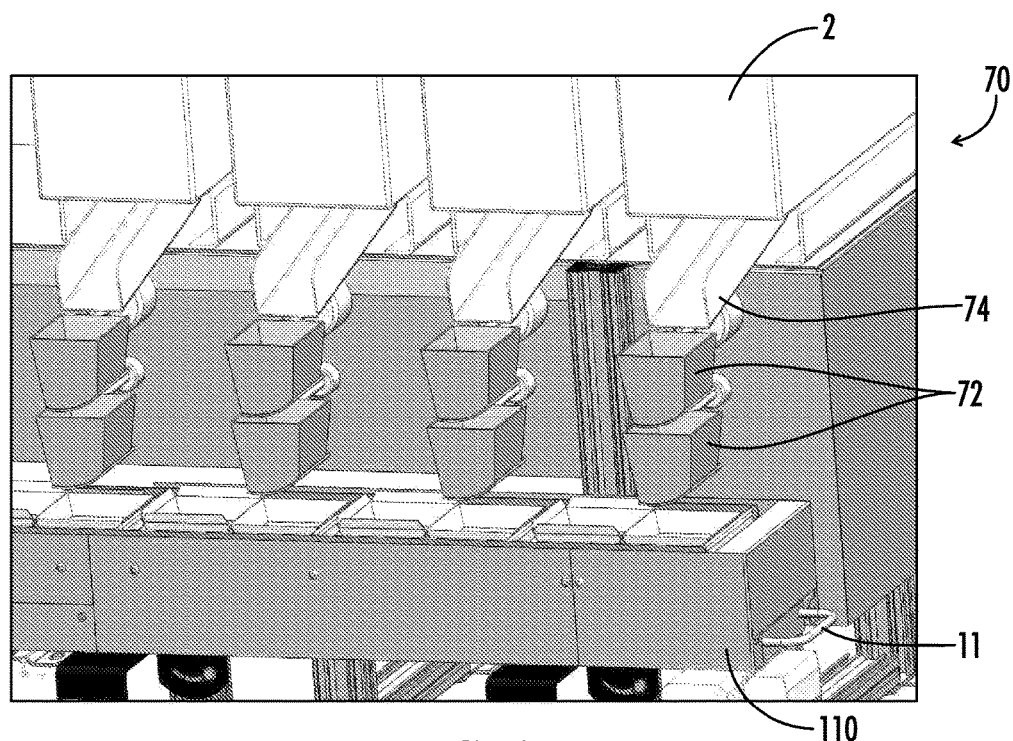
FIG. 1F is an illustration showing a partial front perspective view of dispensing system and an excess food system made in accordance with the current disclosure.
Figure 1G:
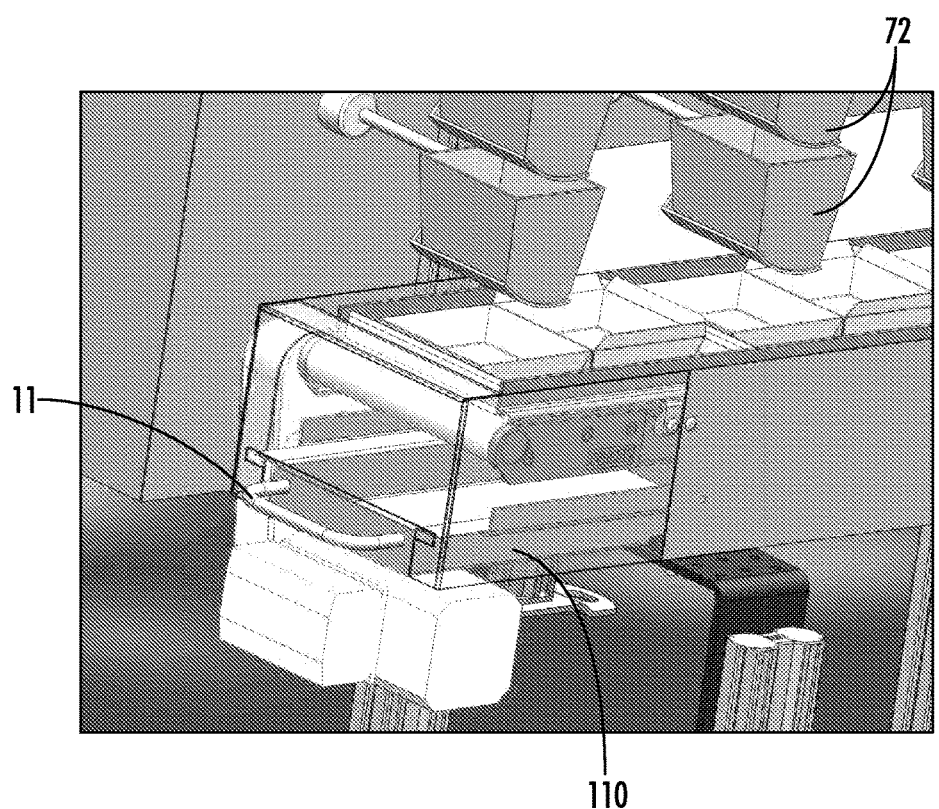
FIG. 1G is an illustration showing a partial front perspective see through view of an excess food system made in accordance with the current disclosure.
Figure 2:
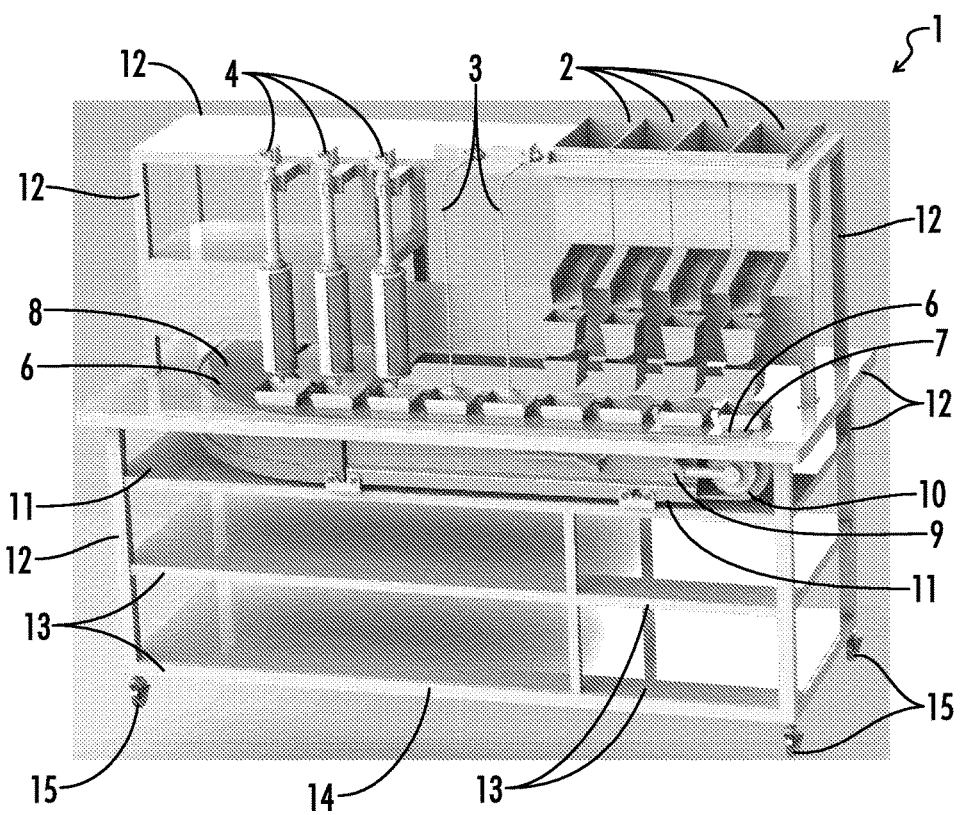
FIG. 2 is an illustration showing a front perspective view of the automated sandwich maker according to one embodiment of the apparatus.
Figure 3:
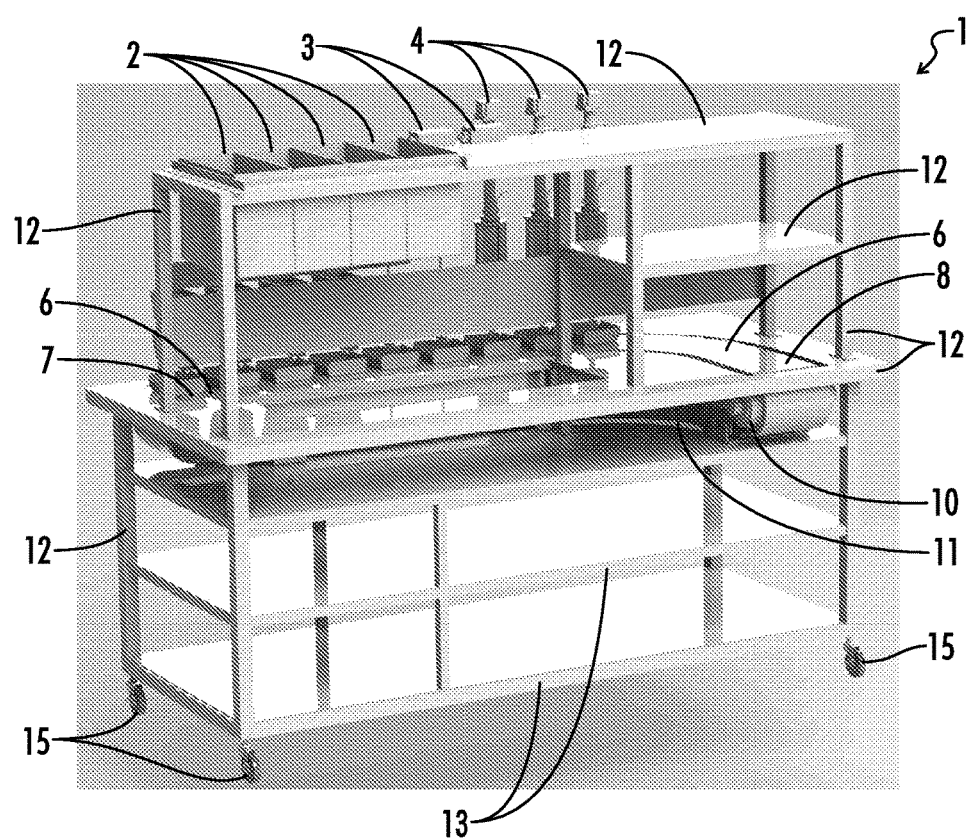
FIG. 3 is an illustration showing a rear perspective view of an automated sandwich maker according to FIG. 2.

Reference will now be made in detail to various embodiments of the disclosure, examples of which are illustrated in the aforementioned drawings.

DETAILED DESCRIPTION OF THE PREFERRED EMBODIMENTS

Referring now to the drawings, common numerals represent common components throughout all Figures. Referring to FIGS. 1A, 1B, 1C, 1D, 2, and 3, there is an illustration of an automated sandwich maker denoted by numeral 1. A scale dispensing system includes vibrating hoppers 2 used as dispensers for food items, such as lettuce, onions, and pickles. A bulk sauce metering system can include the sauce dispensers 3. A cartridge metering system can include the cartridge dispensers 4.

A conveyor system can include a conveyor belt 6 having a straight conveyor belt portion 7 and a radial conveyor belt portion 8. The conveyor belt 6 is driven by a conveyor belt motor 9 and a plurality of pulleys 10. A removable tray 11 is located beneath the conveyor belt 6.

A housing 12 is preferably manufactured from stainless steel. The housing 12 substantially encompasses the various systems within the automatic sandwich maker 1. The housing further comprises a shelving 13 located beneath the conveyor belt 6. A plurality of parallel rollers 15 can be located beneath the housing 12 and allow for flexible installation locations.

Figure 4:
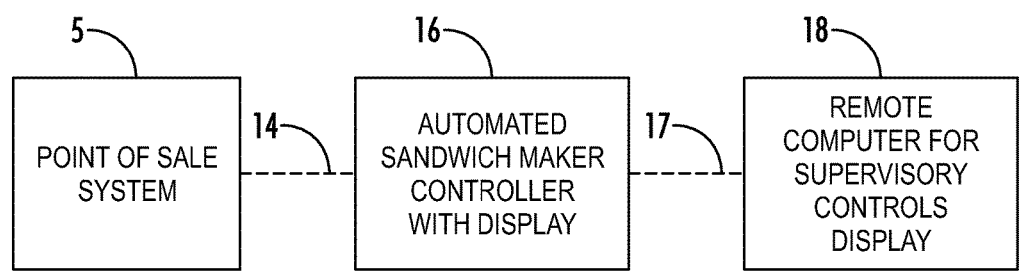
FIG. 4 is an illustration showing a controls diagram of an automated sandwich maker according to an embodiment of the apparatus.
Figure 5:
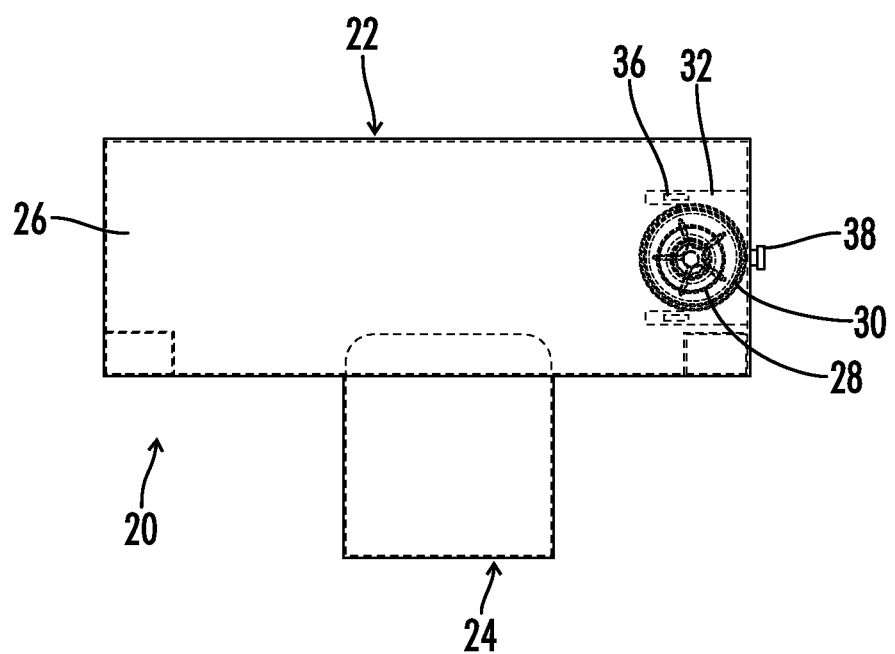
FIG. 5 is an illustration showing a top view of a dispenser case for condiments.
Figures 6, 7:
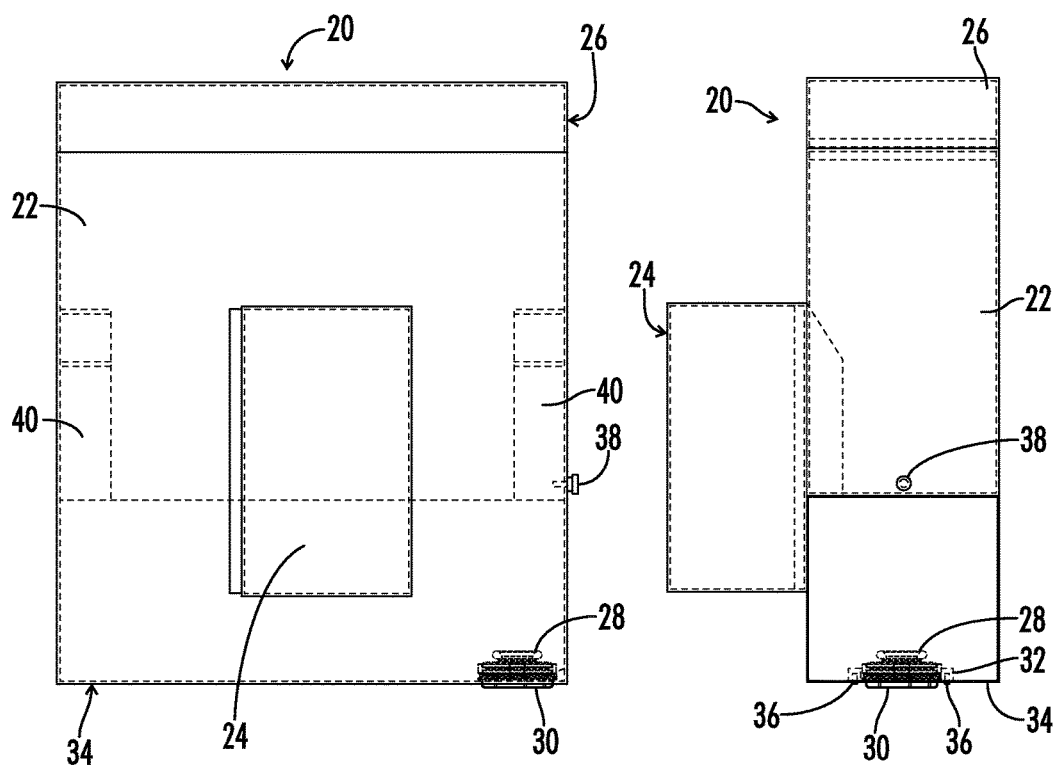
FIG. 6 is an illustration showing a side view of the dispenser case shown in FIG. 5.
FIG. 7 is an illustration showing a front view of the dispenser case shown in FIG. 5.
Figure 8:
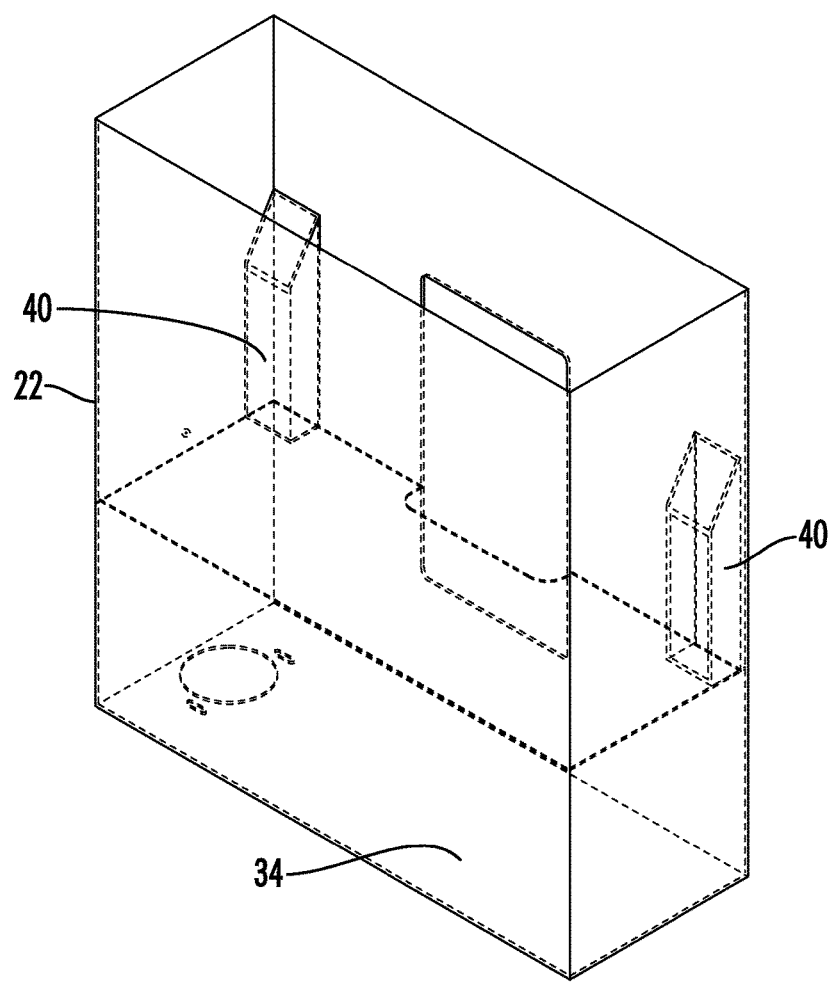
FIG. 8 is an illustration showing a side perspective view of the dispenser case for condiments as seen in FIGS. 5-7.
Figure 10A:
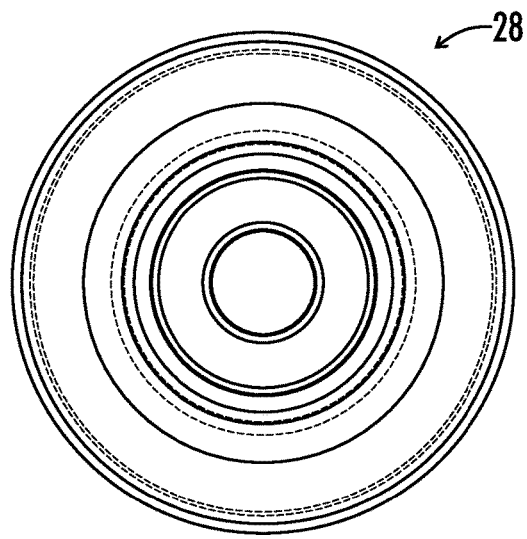
FIG. 10a is an illustration showing a front view of a dispenser plug for condiments used with the dispenser cap for condiments as seen in FIGS. 9a-9c.
Figure 10B:
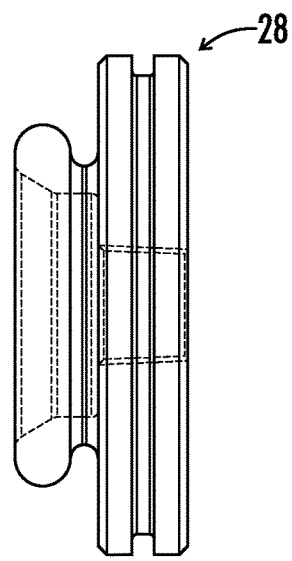
FIG. 10b is an illustration showing a side view of a dispenser plug for condiments used with the dispenser cap for condiments as seen in FIGS. 9a-9c.
Figure 10C:
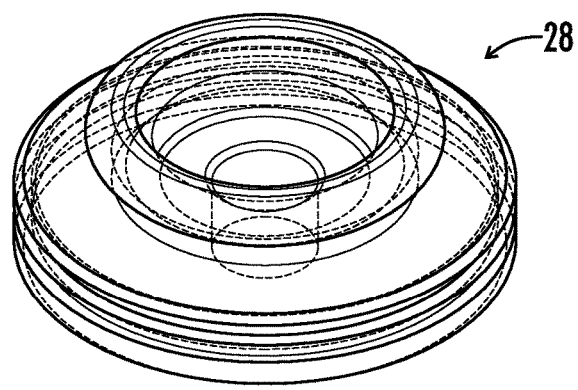
FIG. 10c is an illustration showing a side perspective view of a dispenser plug used with the dispenser cap for condiments as seen in FIGS. 9a-9c.

Referring now to FIG. 4, a point of sale system 5 is integrated with an automated sandwich maker controller 16 using interface 14, which can be hardwired, by a cable, wire, or the like, or can use a first wireless communication device. A second interface 17, which can also be hardwired (by a cable, wire, or the like) or can use a second wireless communication device, integrates the automated sandwich maker controller 16 with a supervisory controls system. The supervisory controls system may be displayed on a remote computer 18.

In one embodiment, the automated sandwich making apparatus 1 can comprise the housing 12, or frame 12, having a plurality of stanchions 50 supporting a work station 52 having a length 54. A conveyor system 60 can be suspended by the housing 12 and including a translational surface 6, such as conveyor belt 6, extending substantially the length 54 of the work station 52. At least one dispensing system 70 can include a food hopper 2 positioned above the work station 52 and shaped to hold food, such as produce or vegetables that can be placed on sandwiches. At least one portion control container 72 can be positioned between the hopper 2 and the translational surface 6 to dispense food to the translational surface 6.

The automated sandwich making apparatus 1 can further comprise at least one bulk sauce metering system 80 supported by the housing 12 and positioned adjacent the at least one dispensing system 70. The bulk sauce metering system 80 can including a sauce flow valve 82 attached to the housing 12, a sauce transportation path 84, and a sauce dispensing head 86. The sauce dispensing head 86 can be positioned at the end of the sauce transportation path 84 and spaced from the translational surface 6. At least one cartridge metering system 90 can be attached to the housing 12 and including at least one cartridge dispenser 92 shaped and sized to hold a container of sauce for application to a sandwich.

Further, a control system 100 can be operatively attached to the housing 12 and linked to the conveyor system 60, the at least one dispensing system 70, the at least one bulk sauce metering system 80, and the at least one cartridge metering system 90. The control system 100 can include a plurality of sensors 102 with each sensor 102 attached to one of the conveyor system 60, the at least one dispensing system 70, the at least one bulk sauce metering system 80, or the at least one cartridge metering system 90.

In an embodiment, the housing 12 further including a lower section 56 positioned below the work station 52 and an upper section 58 positioned above the work station 52. The lower section includes a plurality of substantially horizontal surfaces 55 connected to the stanchions 50. The upper section 58 includes a plurality of supports 57 extending from the work station 52 and a top panel 59 attached to the supports opposite the work station, wherein the at least one dispensing system 70, the at least one bulk sauce metering system 80, and the at least one cartridge metering system 90 are connected to the upper section 58. Each stanchion includes a rolling device 15 positioned opposite the work station 52.

In an embodiment, apparatus further includes a excess food system 110 position under the conveyor system 60 to collect food particles. This excess food system 110 can include a tray 11 positioned at on of several positions under the translational surface 6. Alternately, or in addition to, the excess food system 110 can include a draw type area positioned near an end of the translational surface 6. This draw type area can collect excess food particles as the translational surface 6 ends its top sided movement and begins to return back to the starting point of its movement. Typically with a conveyor belt 6, this point would be at the end of the conveyor belt 6 as the top side of the conveyor belt 6 arcs around a pulley to return back under the bottom to the beginning.

Each dispensing system 70 can include a food path 74 positioned to transfer food from the food hopper 2 to the portion control container 72. The food hopper 2 includes a vibration device 76 use to oscillate the food hopper 2 and progress the food from the food hopper 2 to the food path 74. The portion control container 72 restricts the amount of food from the food hopper 2 to the translational surface 6. This can be accomplished by using the portion control container 72 to collect the food until a certain quantity is reached and then activating the portion control container 72 to release that amount of food to the translational surface 6 and the sandwich positioned there on. For example, one of the sensors 102 can detect the amount of food in the at least one portion control container 72 and transfers data about that amount to the control system 100. The control system 100 can activate the portion control container 72 to release the food to the translational surface 6.

Referring now to FIGS. 5-10C, an alternate condiment dispenser 20 is show. The alternate condiment dispenser 20 includes a dispenser case 22 having a side cover 24, and top 26. A dispenser plug 28 and dispenser cap 30 sit in a retainer slide 32 in the bottom 34 of the dispenser case 22. The dispenser plug 28 and dispenser cap 30 are retained in the retainer slide 32 by retainer pins 36. The dispenser plug 28 and dispenser cap 30 work in unison, by opening and closing, in order to dispense the condiment located inside the cavity of the dispenser case 22. Knob screw 38 can be used to secure the alternate condiment dispenser 20 to the automated sandwich maker 1 through the channels 40.

SEQUENCE OF OPERATION

When a customer orders a sandwich, the customer, or a user/operator, enters the customer's order into a point of sale system 5. The first interface 14 transmits the customer's order to the automated sandwich maker controller 16, which displays the customer's order, other pending orders, and completion instructions for the orders. The automated sandwich maker controller 16 configures the automated sandwich maker 1 to perform according to a recipe for the customer's order.

A user then manually places a bottom collection on the radial conveyer belt portion 8, the bottom collection comprising a box or paper and a bottom bread piece according to the customer's order. A sensor on the automated sandwich maker 1 recognizes when the bottom collection is correctly placed on the radial conveyer belt portion 8. The automated sandwich maker controller 16 subsequently initiates the conveyer belt motor 9, which initiates motion of the conveyer belt 6.

The conveyer belt 6 automatically moves the bottom collection to underneath the cartridge dispensers 4 of the cartridge metering system where sauces, such as mayonnaise, tartar sauce, special sauce, or any combination thereof, are automatically added to the bottom collection according to the recipe. The conveyer belt 6 then automatically moves the bottom collection to underneath the sauce dispensers 3 of the bulk sauce metering system where condiments, such as ketchup, mustard, or both, are automatically added to the bottom collection according to the recipe. Next, the conveyer belt 6 automatically moves the bottom collection to underneath the vibrating hoppers 2 of the scale dispensing system where food particles, such as lettuce, pickles, onions, or any combination thereof, are automatically added to the bottom collection according to the recipe.

The conveyer belt 6 continues to moves the bottom collection to the conveyer belt portion 7, at which point a user manually places a meat, such as beef, chicken, or fish and a top bread piece on the bottom collection, and subsequently either wraps the paper or closes the box.

Alternately, the process can start at the curved belt portion 7 and progress through the cartridge metering system 90, bulk sauce metering system 80, and dispensing system 70 in reverse order as desired base upon the particular sandwich recipe and the user preference.

At any time, a user may use the remote computer 18 to display information regarding the automated sandwich maker 1. From the display, the user may view system status of sauce levels and cartridge levels, system status of bulk and cartridge hoppers, daily production information, status of each station, product description of each order, status of order that is pending, and completion instructions for the order.

Although there have been described particular embodiments of the present invention of a new and useful "Automated Sandwich Maker," it is not intended that such references be construed as limitations upon the scope of this invention as set forth in the following claims.

What is claimed is:

1. An automated sandwich making apparatus comprising:
a housing having a plurality of stanchions supporting a work station having a length;
a conveyor system suspended by the housing, the conveyor system including a translational surface extending substantially the length of the work station;
at least one dispensing system including:
a food hopper positioned above the work station and shaped to hold food,
at least one portion control container positioned between the hopper and the translational surface to dispense food to the translational surface;
at least one bulk sauce metering system supported by the housing and positioned adjacent the at least one dispensing system, the bulk sauce metering system including a sauce flow valve attached to the housing, a sauce transportation path, and a sauce dispensing head;
at least one cartridge metering system attached to the housing and including at least one cartridge dispenser, the at least one cartridge dispenser shaped and sized to hold a container of sauce for application to a sandwich; and
a control system operatively attached to the housing and linked to the conveyor system, the at least one dispensing system, the at least one bulk sauce metering system, and the at least one cartridge metering system, the control system including a plurality of sensors with each sensor attached to one of the conveyor system, the at least one dispensing system, the at least one bulk sauce metering system, or the at least one cartridge metering system.

2. The automated sandwich making apparatus of claim 1, the housing further including a lower section positioned below the work station and an upper section positioned above the work station.

3. The automated sandwich making apparatus of claim 2, wherein the lower section includes a plurality of substantially horizontal surfaces, each substantially horizontal surface connected to the stanchions.

4. The automated sandwich making apparatus of claim 2, wherein the upper section includes a plurality of supports extending from the work station and a top panel attached to the supports opposite the work station, wherein the at least one dispensing system, the at least one bulk sauce metering system, and the at least one cartridge metering system are connected to the upper section.

5. The automated sandwich making apparatus of claim 1, wherein each stanchion includes a rolling device positioned opposite the work station.

6. The automated sandwich making apparatus of claim 1, the conveyor system including a substantially straight conveyor portion and a radial conveyor portion.

7. The automated sandwich making apparatus of claim 1, wherein the conveyor system includes a conveyor belt, a conveyor belt motor, and a plurality of pulleys.

8. The automated sandwich making apparatus of claim 1, further including a excess food system position under the conveyor system to collect food p articles.

9. The automated sandwich making apparatus of claim 1, each dispensing system including a food path positioned to transfer food from the food hopper to the portion control container.

10. The automated sandwich making apparatus of claim 9, wherein the food hopper of the dispensing system includes a vibration device use to oscillate the food hopper and progress the food from the food hopper to the food path.

11. The automated sandwich making apparatus of claim 9, wherein the at least one portion control container of the dispensing system restricts the amount of food from the food hopper to the translational surface.

12. The automated sandwich making apparatus of claim 11, wherein one of the sensors detects the amount of food in the at least one portion control container and transfers that amount to the control system, the control system activates the at least one portion control container to release the food to the translational surface.

13. The automated sandwich making apparatus of claim 1, the sauce dispensing head positioned at the end of the sauce transportation path and spaced from the translational surface.

* * * * *